United States Patent

Peñaloza González et al.

(10) Patent No.: US 12,484,569 B2
(45) Date of Patent: Dec. 2, 2025

(54) METHOD AND SYSTEM FOR MONITORING AND CONTROLLING THE PRESENCE OF AT LEAST ONE TYPE OF INSECT IN AGRICULTURAL CROPS

(71) Applicants: Andrés Peñaloza González, Santiago (CL); Antonio Cabreira Véjar, Santiago (CL); Daniel Jiménez Ballart, Santiago (CL)

(72) Inventors: Andrés Peñaloza González, Santiago (CL); Antonio Cabreira Véjar, Santiago (CL); Daniel Jiménez Ballart, Santiago (CL); Bárbara Valenzuela González, Santiago (CL)

(73) Assignees: Andrés Peñaloza González, Santiago (CL); Antonio Cabreira Véjar, Santiago (CL); Daniel Jiménez Ballart, Santiago (CL)

( * ) Notice: Subject to any disclaimer, the term of this patent is extended or adjusted under 35 U.S.C. 154(b) by 507 days.

(21) Appl. No.: 18/014,046

(22) PCT Filed: Jun. 30, 2020

(86) PCT No.: PCT/CL2020/050068
§ 371 (c)(1),
(2) Date: Sep. 15, 2023

(87) PCT Pub. No.: WO2022/000098
PCT Pub. Date: Jan. 6, 2022

(65) Prior Publication Data
US 2024/0016136 A1      Jan. 18, 2024

(51) Int. Cl.
*A01M 1/02* (2006.01)

(52) U.S. Cl.
CPC .................. *A01M 1/026* (2013.01)

(58) Field of Classification Search
CPC .......... A01M 1/026; A01M 1/00; A01M 1/02; Y02P 60/12; A01G 13/10; A01N 61/00; A01N 61/02; G06Q 50/02
(Continued)

(56) References Cited

U.S. PATENT DOCUMENTS 5,290,556 A * 3/1994 McKibben ........... A01N 25/006
                                                            424/408
7,133,800 B2 * 11/2006 Delin .................... H04J 3/0641
                                                            370/464

(Continued)

FOREIGN PATENT DOCUMENTS

KR        20090002711         1/2009
KR        20090002711 A       1/2009

(Continued)

*Primary Examiner* — Omar Casillashernandez
(74) *Attorney, Agent, or Firm* — FisherBroyles, LLP; Jason P. Mueller (57) ABSTRACT

A method for monitoring and controlling the presence of at least one type of insect on agricultural crops, comprising the following stages: attracting and capturing at least one insect; obtaining at least one internal photograph of said interior surface; obtaining at least one external photograph of a crop coverage area; measuring the ambient temperature, soil temperature, ambient humidity and soil humidity in the crop coverage area; sending the data to at least one control device; and subsequently to at least one analysis device; detecting if there is the presence of at least one insect in it; identifying the species to which the at least one photographed insect belongs; including in an insect count for the identified species the at least one identified insect; determining a degrees day and an accumulated degrees day; determining the phenological stage of the at least one insect and of the crop coverage area; evaluating based on one or more of the parameters whether it is appropriate to apply at least one agrochemical in said crop coverage area; alerting (Continued)

an operator in the event of the application of at least one agrochemical in the crop coverage area; storing in the at least one analysis device the parameters obtained and the evaluation of whether the application of at least one agrochemical corresponds; and using the stored information in the determination of future indications for the application of at least one agrochemical in the crop coverage area.

20 Claims, 4 Drawing Sheets

(58) Field of Classification Search
USPC .................................................. 340/573.1
See application file for complete search history.

(56) References Cited

U.S. PATENT DOCUMENTS

| | | | | |
|---|---|---|---|---|
| 2018/0168130 A1* | 6/2018 | Wu | ................... | A01M 1/026 |
| 2019/0327951 A1* | 10/2019 | Selvig | ................ | G06V 20/52 |
| 2021/0000097 A1* | 1/2021 | Marchesini | ......... | A01M 7/0089 |
| 2022/0125029 A1* | 4/2022 | Chapa | ................... | A61F 7/0085 |

FOREIGN PATENT DOCUMENTS

| | | |
|---|---|---|
| KR | 20100127476 | 12/2010 |
| KR | 20100127476 A | 12/2010 |
| KR | 20110053762 | 5/2011 |
| KR | 20110053762 A | 5/2011 |
| KR | 101491830 | 2/2015 |
| KR | 101491830 B1 | 2/2015 |
| WO | 2020051650 | 3/2020 |
| WO | 2020051650 A1 | 3/2020 |

* cited by examiner

METHOD AND SYSTEM FOR MONITORING AND CONTROLLING THE PRESENCE OF AT LEAST ONE TYPE OF INSECT IN AGRICULTURAL CROPS

CROSS REFERENCE

This application is a national stage entry application under 35 U.S.C. 371 of PCT Patent Application No. PCT/CL2020/050068, filed Jun. 30, 2020, the entire contents of each of which are incorporated herein by reference.

The present invention refers to a method and system to monitor and control the presence of at least one type of insect in agricultural crops, such as Lobesia Botrana and, particularly, to alert the ideal moment of application of agrochemical products in said agricultural crops, which are usually affected by different types of pests during their production cycle.

In this sense, the method of the invention is carried out by means of a system that essentially comprises at least one capture device arranged in a host, to attract and capture at least one insect on an interior surface of said device; at least one internal photographic device arranged on top of the at least one capture device to obtain at least one internal photograph of the inner surface of said at least one capture device; at least one external photographic device arranged so as to point towards a crop coverage area to obtain at least one external photograph of said crop coverage area; at least one ambient temperature sensor to measure the ambient temperature in the crop coverage area; at least one soil temperature sensor to measure the soil temperature in the crop coverage area; at least one ambient humidity sensor to measure ambient humidity in the crop coverage area; at least one soil humidity sensor to measure soil humidity in the crop coverage area, and at least one control device to receive data obtained from the at least one internal photographic device, the at least one external photographic device, the at least one ambient temperature sensor, the at least one soil temperature sensor, the at least one ambient humidity sensor and the at least one soil humidity sensor, and to monitor their operation.

The method and system of the invention also comprise at least one analysis device, which receives the information related to the internal and external photographs in addition to the data on ambient temperature, soil temperature, ambient humidity and soil humidity, storing them and detecting the presence of at least one insect photographed on the internal surface of the capture device together with the species to which it belongs, including it in an insect count for the identified species. In addition, the analysis device allows to obtain, using the data on ambient temperature and soil temperature, the degrees day and accumulated degrees day for the crop coverage area and to determine, using said information related to the degrees day and accumulated degrees day together with at least one internal and external photograph sent, the phenological stage in which it is located, both the identified insect and the photographed crop coverage area.

Based on one or more of the parameters obtained by the analysis device it is possible to alert the operator user of the system if it is appropriate to apply at least one agrochemical in a given crop coverage area, wherein the system of the invention is operating.

BACKGROUND

At present, the agricultural industry in exporting countries shares a common problem in which it is expected that insect pests will have a much greater effect than at present. This, largely due to global warming which causes increased temperatures in agricultural areas, which leads to greater activity in insects and their ability to generate resistance to the use of agrochemicals.

The problems and damage caused by an insect pest in a crop are different for each species, wherein there is a great variety that is relevant depending on the product that is grown. In general, they act in a similar way, laying their eggs on the fruits, feeding on them, procreating and quickly covering the fields, reducing the price of the fruit to a minimum leaving it without the possibility of being exported. In addition, in the event that contaminated fruit is exported, the consequence is even worse, since the country of destination can apply severe sanctions, both in terms of restrictions for exports and economic ones.

For this reason, some of these pests are directly monitored by the entities in charge of agricultural activity in some countries.

In this context, and specifically in the field of pest monitoring and control methods and systems, the vast majority of the agricultural industry uses the well-known pheromone traps in their fields which are monitored manually once or twice a week to count the number of insects in them, in order to make decisions regarding the best moment for the application of agrochemicals and fumigation processes in the different areas of a crop. However, this way of operating entails some problems, such as the delay in obtaining the data from the different traps arranged in the field, which can take considerable time if one takes into account that a field can have dozens of hectares, which added to the fact that said data collection tasks are not carried out every day, can lead to encountering a pest already installed in one or more parts of the crop at the time of said data collection.

In addition, due to the extension of the fields, the collection of these data from the different traps often requires the employment of several workers, which makes this way of operating more expensive having to spend an excessively long time in just one task.

On the other hand, by not having a daily monitoring of the crop areas a greater amount of agrochemicals than required is generally used, since the insect population has already reproduced in excess at the time of deciding to apply products in a crop. Sometimes, the applications are carried out as a preventive and mandatory measure due to the lack of more precise and recurring information. The delay in becoming aware of the presence of an insect species in border areas or areas of agricultural relevance makes the problem to be faced in the future significantly greater.

A more complete monitoring would make it possible to fill information gaps and measure other variables in addition to population density, such as ambient or soil temperature and humidity or relevant events in the phenology of the crop and of the monitored insect(s), so as to better determine and understand how each generation of the pest to be controlled develops, thus providing a more accurate indication of the right time to apply agrochemicals to a crop, allowing the use of these agents to be minimized, generating considerable savings for farmers and harvesting fruit with less exposure to chemicals increasing its sale value.

In the field of patents there are also solutions aimed at monitoring and controlling insect pests. For example, Patent Application US2019364871A1 describes an arthropod trap with an aerosol dispenser that can be remotely controlled to dispense aerosol doses of an active ingredient such as a pheromone or other semiochemical. The trap allows the capture of images through capture means within the trap, which communicate wirelessly to a server or remote application. The dispenser is preferably inverted with the nozzle near the bottom end of the inverted dispenser. A drive mechanism controls the spray rate according to a program or according to individual spray commands, each of which can be received wirelessly by the trap. Images of the capture media can be used as comments to verify or modify the metered dosing schedule. In this sense, the system described in this document differs from the present invention in several aspects, the most relevant being the use of an external photographic device to monitor the phenological development of the crop, as well as the use of sensors arranged in the crop area for monitoring environmental variables. These data make it possible to obtain specific parameters that in turn allow a more precise indication of the right moment to proceed with the application of one or more agrochemicals in the monitored crop.

Another example is the one disclosed in the Patent Application US2017223943A1, which describes integrated pest management systems (IPM) and electronic insect monitoring devices (EIMD). In some embodiments, the EIMDs may each comprise a lure for attracting at least one target insect species, one or more sensors configured to generate one or more output signals in response to an individual insect approaching the lure and an electronic controller configured to count a number of individual insects approaching the lure. In some embodiments, the IPM system may comprise a plurality of EIMDs configured to communicate over a wireless network shared by the plurality of EIMDs.

In this case, once again the difference between the present invention and the systems and devices described in document US2017223943A1 lies mainly in the use of an external photographic device to monitor the phenological development of the crop, as well as the use of sensors arranged in the same crop for the monitoring of environmental variables, such as ambient temperature and humidity, which allows the determination of specific parameters for the determination of the best moment for the application of one or more agrochemicals in the monitored crop, such as for example, degrees day and accumulated degrees day. In addition, in the Application US2017223943A1, the capture and count of insects is carried out by analyzing the characteristics of the voltage and current signals at the terminals of a bioimpedance sensor by applying an electrical pulse to the insect that enters the device attracted by the lure, which is completely different from the way of performing capture and counting in the present invention, wherein specific pheromone based capture devices and image recognition based counting are used.

Additionally, none of the documents cited above describe a system able to integrate the information collected during a harvest season, for example, in future measurements, which substantially improves the indications to recommend the best time to apply agrochemicals in the crop. The present invention stores all the information obtained from the images inside the capture device and the crop, in addition to the parameters associated with temperature and humidity, in order to include and weigh them in future indications to apply agrochemicals to the monitored crop, which allows the system to learn from the behavior of insects and the climate in a specific crop area over time.

Finally, the systems and devices of the state of the art do not suggest an efficient way of arranging the associated power supply device responsible for powering the different components in said systems. Although some of them use photovoltaic panels in combination with rechargeable batteries, said panels are usually attached to the top of the system which, at first sight, is adequate, in order to capture as much radiation as possible. However, this arrangement may not be the best, since it does not consider that, since these systems are usually located on the branches of trees or plants or close to them, the growth and flowering of these crops frequently causes the solar radiation does not reach the solar panels optimally, having to move the devices from place due to the high probability that they turn off and cannot continue operating since the batteries cannot be charged to the level required to maintain the operation of the system. Having to move the devices from one place causes two potential problems, one of them associated with the fact that there must be one or more operators assigned to monitor, either remotely or in person, the energy levels of each of the devices so to go and move them in the event that a considerable drop in energy or the disconnection of any of them is detected causing agricultural personnel to mobilize through the field thus increasing the costs of monitoring and pest control. The other possible problem is related to the fact that sometimes the new location in which the device is placed in order to receive more radiation is not the best for capturing insects thus distorting data collection and the subsequent indication of pesticides application in the respective crop area.

Therefore, it is necessary to have a method and system that is not only capable of carrying out an optimal capture of insects but also integrates other variables and parameters that allow improving the decision regarding the best moment for the application of agrochemicals either in a specific harvest season or in future seasons, wherein the obtained information is not lost but is incorporated by the system to include it in future indications for the application of agrochemicals in the crop area wherein the system is operating. In addition, it is necessary to have a system that provides an optimal and reliable arrangement of its power generation and power supply system, in order to guarantee that the operation of the system will not be affected regardless of weather conditions or the arrangement of the insect capture device. This and other advantages associated with other aspects of the technology are described in greater detail below.

DESCRIPTION OF THE INVENTION

The invention refers to a method and system to monitor and control the presence of at least one type of insect in agricultural crops which allows a more precise indication about the ideal moment for the application of at least one agrochemical in a crop area where the system is operating, based on obtaining additional variables and parameters to those used in the state of the art. In addition, the present invention provides a method and system that gives an indication of agrochemical application that improves its precision over time thanks to the continuous storage of information and data obtained over time, with which the system feeds back and learns for future indications for agrochemicals application.

On the other hand, the method and system provided by the invention allows to ensure the continuous operation of all the components of the system because its power generation system is optimally arranged either on the capture device or separated from it, to receive the amount of radiation required for the proper operation of the system.

The characteristics and advantages mentioned for the present invention prevent agricultural operators from having to continuously inspect the traps installed for data collection, since all the information collected by the system is sent to an analysis device, which stores all the information sent by the different devices and sensors of the system, processing it and delivering a precise indication about the best moment for the application of agrochemicals in the monitored crop area. From this indication, the consumption of agrochemicals is minimized or even eliminated in some monitored areas thanks to the fact that the application of said agrochemicals is carried out at the precise moment in which it is required and not when the pest is already expanded in the crop, also avoiding the use of excessive amounts of these products in a preventive manner given the little information that farmers currently have.

According to a first preferred embodiment of the invention, the method for monitoring and controlling the presence of at least one insect in agricultural crops comprises the following stages:

attracting and capturing at least one insect, by means of at least one capture device, towards an inner surface of said at least one device;

obtaining at least one internal photograph of said internal surface by means of at least one internal photographic device;

obtaining at least one external photograph of a crop coverage area using at least one external photographic device;

measuring the ambient temperature in the crop coverage area using at least one ambient temperature sensor;

measuring the soil temperature in the crop coverage area using at least one soil temperature sensor;

measuring the ambient humidity in the crop coverage area by means of at least one ambient humidity sensor;

measuring soil humidity in the crop coverage area using at least one soil humidity sensor;

sending the at least one internal photograph, the at least one external photograph and data on ambient temperature, soil temperature, ambient humidity; and soil humidity from the at least one photographic device and the at least one sensor to the at least one control device;

sending the at least one internal photograph, the at least one external photograph and the data on ambient temperature, soil temperature, ambient humidity and soil humidity, from the at least one control device to the at least one analysis device;

detecting through the at least one analysis device, using the at least one internal photograph sent, if there is the presence of at least one insect in it;

in case there is at least one insect in the internal photograph, identifying through the at least one analysis device, the species to which the at least one photographed insect belongs;

including in an insect count for the identified species through the at least one analysis device, the at least one identified insect;

determining, through the at least one analysis device, using the data on ambient temperature, degrees day and accumulated degrees day of the crop coverage area;

determining, through the at least one analysis device, using one or more of the data related to the at least one internal photograph and external photograph, and the degrees day and accumulated degrees day, the phenological stage of the at least one insect;

determining through the at least one analysis device, using one or more of the data related to the at least one external photograph and the degrees day and accumulated degrees day, the phenological stage of the crop coverage area;

evaluating from one or more of the parameters obtained on the species of the at least one insect, the insect count for the identified species, degrees day, accumulated degrees day, data on ambient temperature, soil temperature, ambient humidity and soil humidity, and the phenological stage of the at least one identified insect and of the crop coverage area, if it is appropriate to apply at least one agrochemical in said crop coverage area;

alerting an operator in case the application of the at least one agrochemical in the crop coverage area is appropriate;

storing in the at least one analysis device, the parameters obtained on the species of the at least one insect, the insect count for the identified species, degrees day, accumulated degrees day, data on ambient temperature, soil temperature, ambient humidity and soil humidity, the phenological stage of the at least one identified insect and the crop coverage area, and about the evaluation of whether the application of the at least one agrochemical is appropriate; and using the stored information about the parameters obtained on the species of the at least one insect, the insect count for the identified species, degrees day, accumulated degrees day, data on ambient temperature, soil temperature, ambient humidity and soil humidity, the phenological stage of the at least one identified insect and the crop coverage area, and about the evaluation of whether the application of the at least one agrochemical is appropriate, in the determination of future indications for the application of at least one agrochemical in the crop coverage area.

The method of the invention operates once the components of the system have been installed in the host, which may be one of the trees in the crop area to be monitored or on a post installed close to the crop area to be monitored. Once it has started its operation the capture device attracts insects to its inner surface which is impregnated with a substance that attracts insects of the species to be monitored, such as a pheromone. Once the insect or insects land on the interior surface of the capture device they are trapped by a sticky substance remaining completely immobilized.

The method of the invention also comprises collecting a series of parameters that allow the system to alert the operator when it is time to proceed with the application of one or more agrochemicals in a particular crop area. Said parameters are related to obtaining photographs of the interior surface of the capture device in which the insects are trapped, as well as photographs of the state of the crop which allow visualizing, for example, the state of the tree or plant and its fruits and/or flowers. In addition, the parameters obtained allow to observe environmental variables regarding the temperature and humidity of the environment and the soil in the area covered by the crop.

The crop coverage area should be understood as the coverage radius that allows a capture device to be covered together with photographic devices and sensors, where to cover a complete crop, multiple modules can be arranged made up of different capture devices with their respective photographic devices and sensors, controlled in turn by respective control devices. These control devices send the information collected to at least one analysis device which may be located remotely from the crop, which collects all the information provided by each of the modules and evaluates for each of them whether the application of one or more agrochemicals is advisable, alerting the system operator if necessary through the display device. In this way, a differentiated recommendation is obtained for each of the crop areas wherein each module of devices and sensors is operating.

As mentioned above, the analysis device obtains various parameters. The first of them is related to detecting the presence of one or more insects in the photograph of the internal surface, wherein it must also be identified if the insects belong to the species to be monitored.

Said detection and identification is carried out through a machine learning model continuously trained to detect and identify the captures of the species of interest and thus determine the amount of said captures on a daily basis.

Once the identification of the insect(s) in the internal photograph has been made, the analysis device proceeds to store the count records in an insect count for each of the monitored species, this information being accessible to the system operator through a platform visualised through the display device.

Another parameter obtained by the analysis device is related to obtaining the degrees day (DD) for the different crop coverage areas wherein the system operates based on the temperature data received from each of the device modules and sensors and the parameters established in the analysis device in relation to the type of crop analyzed. This operation can be calculated for a period of time (day, week, month, year), a part or the entire crop cycle.

In addition, the analysis device obtains the accumulated degrees day (ADD) for each crop coverage zone monitored, which correspond to the sum of the degrees of each day in a period of time, which in simple terms, expresses the total amount of energy to which the tree or plant is subjected during its growth cycle. The ADD allow the analysis device to determine with a high degree of certainty the phenological stage in which the monitored insect species is found, as well as the phenological stage of each of the trees or plants in each of the crop coverage areas.

In this sense, the analysis device obtains another parameter that allows to improve the certainty in the detection of the phenological stage of the host in the crop coverage areas which are photographed by each of the external photographic devices, obtaining images of the outside of the tree or plant where the development of the fruit and/or flower can be observed in detail, as well as various physical characteristics of said fruits and/or flowers together with the rest of the tree or plant, which allow the analysis device to visually determine the phenological stage in which the various crop coverage areas are found. In addition, it is possible to visually identify the damage that the fruits and/or flowers may be suffering from the species of monitored insects or by the action of other types of insects or third parties that may be affecting one or more crop coverage areas from which an alert is generated to the system operator.

The way to determine said phenological stage is through an image recognition model, as occurs for the analysis of the photographs of the internal surface of the capture device, through the use of a machine learning model continuously trained to identify relevant events, in order to identify the phenological stage in which the host is found in each of the monitored crop coverage areas.

Having two ways to determine the phenological stage of the host in the crop coverage areas allows to improve the accuracy of said determination, also making the indication of the application of pesticides in each of the coverage areas more precise, depending on the phenological stage in which they are. On the other hand, the phenological stage of the monitored pest(s) is determined from the ADD and the relevant events in the development of the host's phenology.

Once the analysis device has continuously stored and processed the data that allows estimating the future phenological development of the monitored species, the date on which the ADD that determine the application of certain products that have been previously established in the system could be met, is estimated. The system, through the analysis device estimates an application date and the type of product that is recommended according to the phenological state of the host and the pest according to the ADD and according to the events identified in the phenological development of the host. The system, through the analysis device also determines the date on which it notifies or alerts the system operator of the application recommendation of the agrochemical product(s) in the crop coverage area through the display device.

Finally, the analysis device stores all the information received, both the unprocessed information received by each of the device modules and sensors, as well as the information obtained through the processing of said unprocessed information together with the continuous evaluations carried out to determine if it is advisable or not to proceed with the application of one or more agrochemicals in the crop coverage area. This allows the system to incorporate this information through machine learning models, in order to improve the accuracy of each next indication that the analysis device delivers to the operator for each of the crop coverage areas regarding whether or not the application of one or more agrochemicals is appropriate.

According to another embodiment of the invention, the method also comprises sending the location of the at least one internal photographic device of the at least one external photographic device and of the at least one control device, through at least one device location. This allows the system operator to know at all times the location of each of the main system devices that are located in the different crop coverage areas, which can be of vital importance in the event that any of the devices is stolen.

According to another embodiment of the invention, the method also comprises energizing the at least one internal photographic device, the at least one external photographic device, the at least one ambient temperature sensor, the at least one ambient temperature sensor, the at least one soil temperature sensor, the at least one ambient humidity sensor, the at least one soil humidity sensor and the at least one location device, through at least one energy storage device.

According to another embodiment of the invention, the method further comprises recharging the at least one energy storage device through at least one energy generation device.

According to another embodiment of the invention, the method further comprises sending the location of the at least one power generation device through the at least one location device.

According to another embodiment of the invention, the method also comprises obtaining by means of the at least one analysis device, forecasts of temperature, humidity, rainfall, and wind speed and direction, from databases hosted on the Internet or in other climatological databases, such as computer systems accessible through API (Application Programming Interface) wherein the method also comprises including said temperature, humidity, rainfall and wind speed and direction forecasts in the stage of evaluating whether the application of at least one agrochemical in the crop area is appropriate.

This embodiment of the invention is particularly important, since it allows the system to incorporate additional information in the estimation of the date of application and the type of agrochemical product recommended, through the analysis device, adding these variables to those mentioned previously in relation to the phenological state of the host and the pest according to the ADD and according to the events identified in the phenological development of the host. Said information can be useful, for example, to not recommend the application of an agrochemical in a crop coverage area, in the event that unfavorable rains or winds are forecast for said product application in said area.

According to another embodiment of the invention, the step of obtaining at least one internal photograph of said internal surface is carried out in a range between 15 minutes and 24 hours. Preferably, the internal photography device obtains an image of the internal surface of the capture device once every day.

According to another embodiment of the invention, the stage of obtaining at least one external photograph of a crop coverage area is carried out in a range between 15 minutes and 24 hours. Preferably, the external photography device obtains an image of the crop area once every day.

According to another embodiment of the invention, the stage of measuring the ambient temperature by means of at least one ambient temperature sensor is carried out in a range between 15 minutes and 24 hours, where the stage of measuring the soil temperature using at least one soil temperature sensor, is also carried out in a range between 15 minutes and 24 hours. Preferably, the data on ambient temperature and soil temperature is obtained every 30 minutes by the respective sensors.

According to another embodiment of the invention, the stage of measuring the ambient humidity by means of at least one ambient humidity sensor is carried out in a range between 15 minutes and 24 hours, where the stage of measuring the soil humidity by means of at least one soil humidity sensor is also carried out in a range between 15 minutes and 24 hours. Preferably, the data on ambient humidity and soil humidity is obtained every 30 minutes by the respective sensors.

According to another embodiment of the invention, the stage of sending the at least one internal photograph, the at least one external photograph and the data on ambient temperature, soil temperature, ambient humidity and soil humidity to at least one analysis device is carried out at least once every 24 hours, through a wireless communication protocol that allows data transfer.

In relation to all the ranges for taking photographs or measuring ambient temperature and humidity, these can be modified both in the time in which the photograph or measurement is obtained, as well as in its periodicity by the system operator. The same occurs with the frequency with which the information is sent from the control device to the analysis device which can also be modified by the system operator, in order to increase or decrease said frequency of information sending.

According to another embodiment of the invention, the stage of alerting a system operator in the event of the application of at least one agrochemical in the crop coverage area, comprises indicating a notification date, a recommended date of application and a list with the agrochemical product(s) that is recommended to be applied in the crop coverage area, where said warning is carried out at the moment in which the system evaluates that it is appropriate to carry out an agrochemical application, also the operator can configure the system so that it alerts on a specific variable that is of interest to him and that is being measured by the system, even if there is no recommendation for the application of agrochemicals, for example, data on ambient and/or soil temperature and humidity, as well as data on the degrees day and accumulated degrees day and/or visualization of the images obtained through the photographic devices. The periodicity of these alerts can also be configured by the operator, in order to receive information through the display device in ranges that go from at least once every 24 hours.

On the other hand, according to a second preferred embodiment of the invention, a system for monitoring and controlling the presence of at least one type of insect in agricultural crops is also described, comprising:

- at least one capture device arranged in a host to attract and capture at least one insect on an internal surface of said device;
- at least one internal photographic device arranged on top of the at least one capture device to obtain at least one internal photograph of the inner surface of said at least one capture device;
- at least one external photographic device arranged so as to point towards a crop coverage area to obtain at least one external photograph of said crop coverage area;
- at least one ambient temperature sensor to measure the ambient temperature in the crop coverage area;
- at least one soil temperature sensor to measure the soil temperature in the crop coverage area;
- at least one ambient humidity sensor to measure ambient humidity in the crop coverage area;
- at least one soil humidity sensor to measure soil humidity in the crop coverage area;
- at least one control device to receive data obtained from the at least one internal photographic device, the at least one external photographic device, the at least one ambient temperature sensor, the at least one soil temperature sensor, the at least one ambient humidity sensor and the at least one soil humidity sensor, and to monitor their operation;
- at least one analysis device which receives the data obtained from the at least one control device to analyze them and assess whether the application of at least one agrochemical in the crop coverage area is appropriate; and
- at least one display device which alerts an operator in the event that the application of at least one agrochemical in the crop coverage area is appropriate.

According to another embodiment of the invention, the system also comprises at least one energy storage device, wherein the at least one energy storage device is a lead-acid battery, lithium or any material or combination of materials capable of storing electrochemical energy.

According to another embodiment of the invention, the system further comprises at least one power generation device, wherein the at least one power generation device is arranged on the at least one capture device or so separate from the at least one capture device. Furthermore, preferably, the at least one power generation device is a photovoltaic panel, wherein the at least one power storage device may be arranged together with the at least one power generation device.

According to another embodiment of the invention, the system also comprises at least one location device arranged in the at least one internal photographic device, in the at least one external photographic device, in the at least one control device, and in the at least one power generation device, wherein the at least one location device is a GPS or any other device that allows the geolocation of the at least one capture device.

According to another embodiment of the invention, the system further comprises at least one first cable to connect the at least one power generation device to the at least one energy storage device and at least one second cable to connect the at least one energy storage device to the at least one internal photographic device, to the at least one external photographic device, to the at least one ambient temperature sensor, to the at least one soil temperature sensor, to the at least one ambient humidity, to the at least one soil humidity sensor, to the at least one control device, and to the at least one location device.

In view of the previous description regarding the method and system of the invention, it is relevant to highlight the function of the external photographic device, which obtains photographs of the host exterior which may be a tree or plant specifically of its fruits and/or flowers, in a sustained manner over time and at the different focus points allowing the location of the capture device. Said photographs allow the analysis device to identify key phenological states and changes within the development of plants, such as first leaf, maximum flowering, fruit set, among others. In addition, by associating the information obtained from external photographs with climatic data, it is possible to identify ranges of tolerance to frost or drought observing damage to leaves and flowers.

In addition, there is a relationship between the phenology in crops and the activity of the pests that affect them, which remain constant each season even when weather patterns change, being able to detect from external photographs when the pests are in its most vulnerable stage. For example, the hatching of the gypsy moth eggs (*Lymantria dispar*) begins together with the flowering of apple trees of the "Redbuds" variety which when detected by the system of the invention, it would alert its operator indicating that is the appropriate moment for the application of the specific agrochemical in said crop area where the hatching of eggs was detected.

In other cases in which the advantages of external photography are demonstrated it is possible to observe that the phenological stages of the plants define the moments of application of certain products in the crops. For example, in the case of the olive tree, the application of humus in the stage of maximum flowering improves the yield, volume and weight of the fruit, in addition to other properties. In a similar case, the application of polyamine in anthesis (flower development stage) increases fruit retention in two mango varieties.

On the other hand, in relation to the measurement of environmental conditions, it has been observed that in citrus the application of foliar urea in the sprouting stage during or after an episode of low temperatures increases flowering. From what is described by the method and system of the invention, a low temperature event or any other that is of special interest to the system operator, regarding the temperature or humidity of a crop area, can be alerted by the analysis device indicating to the operator that it is the right time to apply a particular agrochemical or other specific product to the crop.

Finally, it is relevant to highlight the arrangement that the power generation device may have in the system of the invention, which can be integrated together with the capture device or separately, in case the optimal location of the capture device is not be the best location for the power generation device. As mentioned above, this is a common problem in the state of the art where there is a great risk that said energy-generating devices, such as photovoltaic panels, are not capable of charging the batteries of these systems to the necessary level for their proper operation.

Consequently, the present invention provides a method and system for the monitoring and control of insects that is effective and more precise than those currently available on the market, automatically delivering to the operator an indication of the best moment for the application of one or more agrochemicals or another specific agent in the different crop coverage areas that are being monitored by the modules of photographic devices and sensors, either based on the phenology of the host, the phenology of the pest, the climatic conditions or through a combination of one or more of these parameters and variables.

BRIEF DESCRIPTION OF THE FIGURES

As part of the present invention, the following representative figures thereof are presented which show preferred configurations of the invention and, therefore, should not be considered as limiting the definition of the claimed matter.

DETAILED DESCRIPTION OF THE FIGURES

Figure 1:
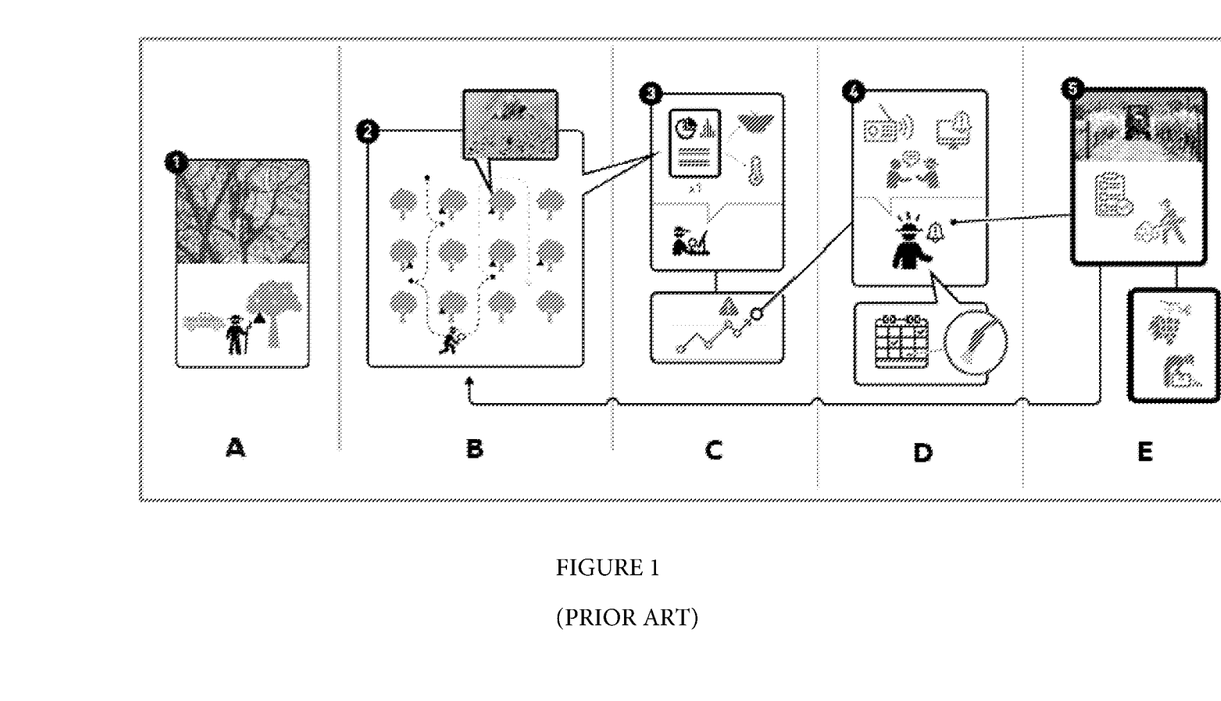
FIG. 1 shows a scheme of the procedure to monitor an insect pest and decide the appropriate moment for the application of agrochemicals in an agricultural crop according to the state of the art.

With reference to the accompanying Figures, FIG. 1 shows a scheme of the procedure to monitor the presence of insects in an agricultural crop and to decide the best moment for the application of agrochemicals in said crop commonly used in the state of the art. For purposes of facilitating the understanding of the procedure, it has been divided into five stages classified as: A: Installation/uninstallation of traps; B: Prospecting for traps; C: Decision regarding the application of agrochemicals; D: Decision communication; and E: Application of agrochemicals.

In stage A, agricultural workers proceed to install traps through the crop to be monitored. The decision about the number of traps to install and the distance between them is usually made through procedures recommended by agricultural institutions which seek that their arrangement covers the entire crop in the best possible way. Stage B, for its part, corresponds to the prospecting that must be done of the installed traps, wherein one or more workers must go through the entire crop to be able to count the number of insects in each of the traps. This task, due to the long time it takes is not possible to carry out every day which would increase the costs associated with the use of workers for these tasks, so the personnel in charge usually carry it out every 4, 7 or 14 days. One of the problems that exists when not having a daily review of the traps is not being able to detect the exact day on which the first capture of the monitored insect species occurs which can lead to making late decisions about the application of agrochemicals in the crop.

In stage C, the worker in charge of making the decision about whether or not to apply agrochemicals to the crop receives the information collected through the different traps, which must be manually entered into a device in order to process them, such as a computer or similar, in which the worker must compare said data obtained with theoretical information regarding the phenology of the insect according to the climatic conditions of the area, which is obtained through internet databases or through a monitoring station.

When the time comes when the worker makes the decision that it is the right time for the application of agrochemicals in the monitored crop stage D begins, where the decision must be communicated to those in charge of carrying out the fumigation. The decision about spraying is generally made for the entire crop, given the impossibility of detecting which zones or areas of the crop are being attacked to a greater or lesser extent by the pest.

Finally, once the decision to fumigate the crop with a specific agrochemical has been communicated the respective tasks are performed in order to carry out this task. As trap monitoring and data processing tasks lack the precision to accurately indicate the right moment to apply agrochemicals to the crop, multiple preventive applications must usually be carried out to avoid the risk that due to poor data sampling and analysis, the pest expands destroying the fruits and/or flowers of the monitored tree or plant.

Figure 2:
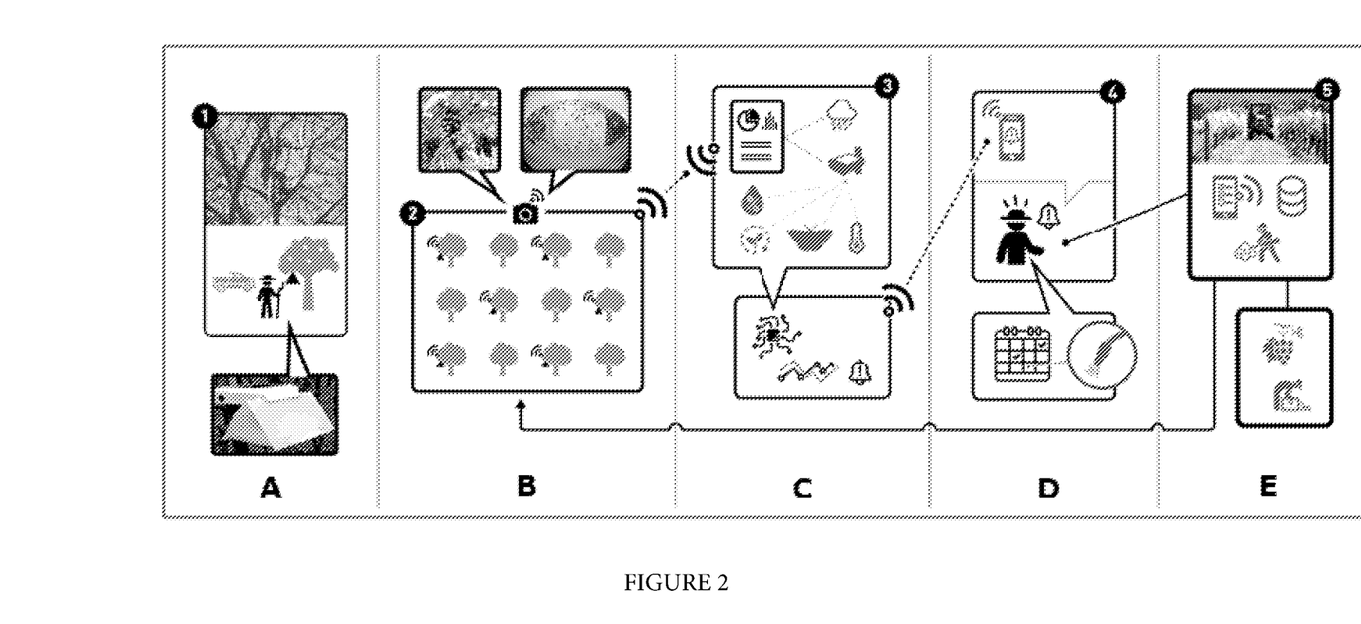
FIG. 2 shows a scheme of the procedure to decide the appropriate moment for the application of one or more agrochemicals in one or more crop coverage areas according to a preferred configuration of the invention.

On the other hand, FIG. 2 shows a scheme of the procedure to decide the appropriate moment for the application of one or more agrochemicals in one or more crop coverage areas according to a preferred configuration of the invention. In this scheme, the tasks included in the procedure have also been divided into five large stages so as to facilitate comparison with FIG. 1 of the state of the art. These stages correspond to: A: Installation/uninstallation; B: Prospecting; C: Decision; D: Communication; and E: Application and registration.

In relation to stage A, this does not vary in terms of how to install the system with respect to what is described in FIG. 1 where one or more workers must go through the crop to be monitored, in order to go installing the components of the system of the invention. The substantial difference is found in the way in which the quantity and distance between the different modules of devices and sensors that together make up the system is decided, which is done according to the monitoring coverage offered by each of said modules allowing to quickly calculate the number of modules needed to cover the crop thus avoiding the placement of unnecessary traps and avoiding unmonitored areas within the crop.

In stage B, related to the prospecting of the traps, this is done automatically by the photographic devices and environmental and soil sensors arranged in each of the modules throughout the crop, wherein it is possible to configure the frequency of data collection for each of these devices and sensors. The method and system of the invention is configured so that the devices and sensors of each of the crop modules send the information collected to the respective control devices which store the information until it is sent to an analysis device at least once a day, which collects all this information from all the control devices arranged in the different modules. This way of sending data avoids the presence of workers in the crop, dedicated only to the task of collecting said data, allowing them to focus on other tasks. In addition, thanks to the constant monitoring that is carried out in each of the modules and the speed with which the information is sent to the analysis device it is possible to obtain the data about a first capture for the species to be monitored in less than 24 hours since it has occurred, allowing in this way to substantially improve the reaction speed in the presence of the pest taking the pertinent decisions to control its expansion in the crop coverage area in which its presence has been detected, which is shown in stage C of FIG. 2.

In step C, the analysis device collects the information sent by each of the modules arranged in the crop, as mentioned in the previous paragraph. This data collection is done automatically and wirelessly through a network that allows wireless data transfer, such as 3G, 4G, 5G, Bluetooth, infrared or any other network that allows this type of data transfer. One of the advantages of the method and system of the invention, compared to the techniques used in the state of the art, is that in the method of the invention not only the amount of captures for the monitored species is used to make the decision to apply or not agrochemicals but other variables are also included, such as the phenological stage of the monitored species and the host in each of the modules arranged in the crop. This information regarding the phenology of the insect and the host is obtained from data on ambient temperature and humidity, soil temperature and humidity, and through photographs obtained from inside the capture device or trap and from the host for each one of the modules. This allows, thanks to the algorithm used by the analysis device, to obtain precise data regarding the development status of the pest in each of the crop coverage areas monitored by each of the modules, alerting precisely in the event that the application of agrochemicals in any of the crop coverage areas is evaluated as necessary. In addition, the method and system of the invention is capable of including additional information regarding the weather forecast (temperature, humidity, rainfall, wind speed, etc.), in order to avoid issuing an alert for the application of agrochemicals in case the system detects that there is a rain forecast or in case the wind is not favorable for its application, among others.

In stage D related to communication, once the analysis device detects the need to apply one or more agrochemicals in one or more of the crop coverage areas, it sends an alert to one or more operators in charge of the system through a display device, such as a smartphone, computer, tablet, etc. This allows the system operator(s) to stop worrying about having to do data analysis tasks spending time comparing data tables which are often not accurate and/or representative of the area where the monitored crop is located.

Finally, in stage E, in the event that the system operator has been notified that the application of one or more agrochemicals is necessary in one or more crop coverage areas, he proceeds to notify the people in charge of said works so that they begin with the fumigation. The method and system of the invention allows the events related to the application of agrochemicals to be carried out only when the need to be done by the analysis device is detected, and only in the specific areas of the monitored crop avoiding preventive fumigations throughout the crop and keeping a specific record for each crop coverage area that has been fumigated. This leads to significant savings in fumigation tasks by farmers allowing them to obtain products with less exposure to chemicals increasing their market value.

Figure 3:
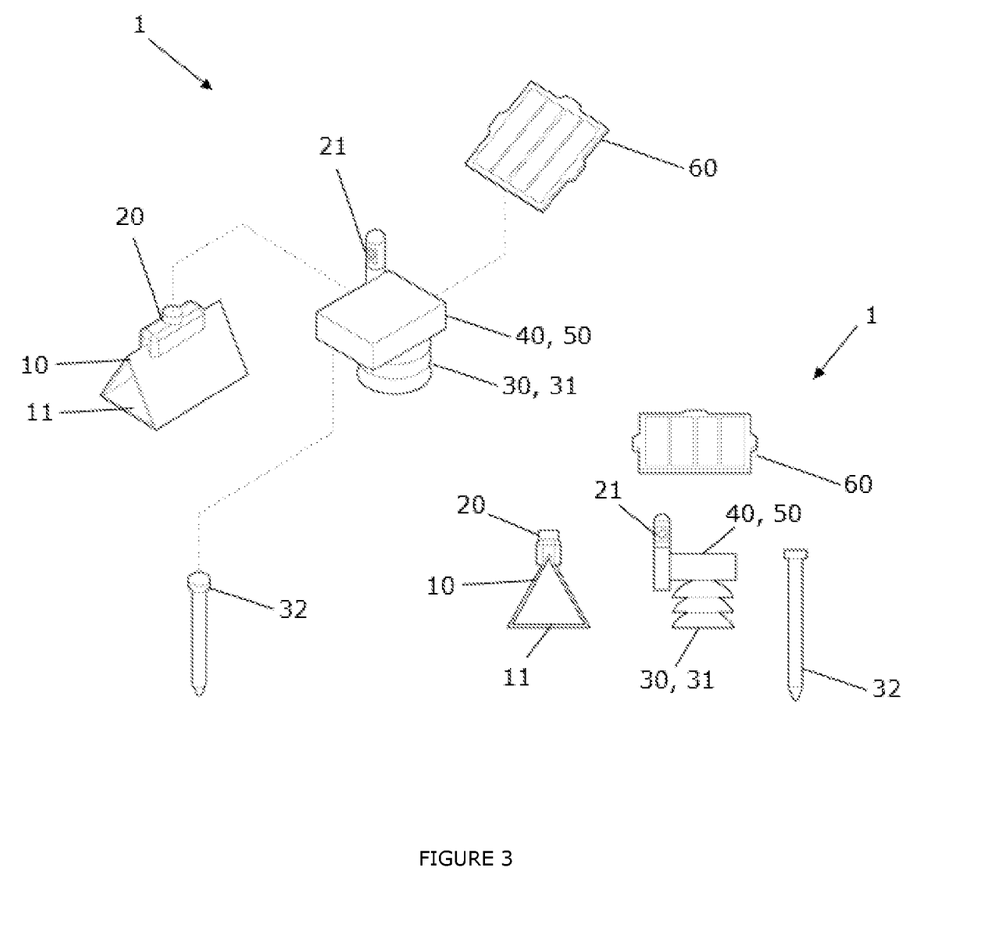
FIG. 3 shows an isometric view and a front view of the components of the system to monitor and control the presence of at least one type of insect in agricultural crops according to a preferred configuration of the invention.
Figure 4:
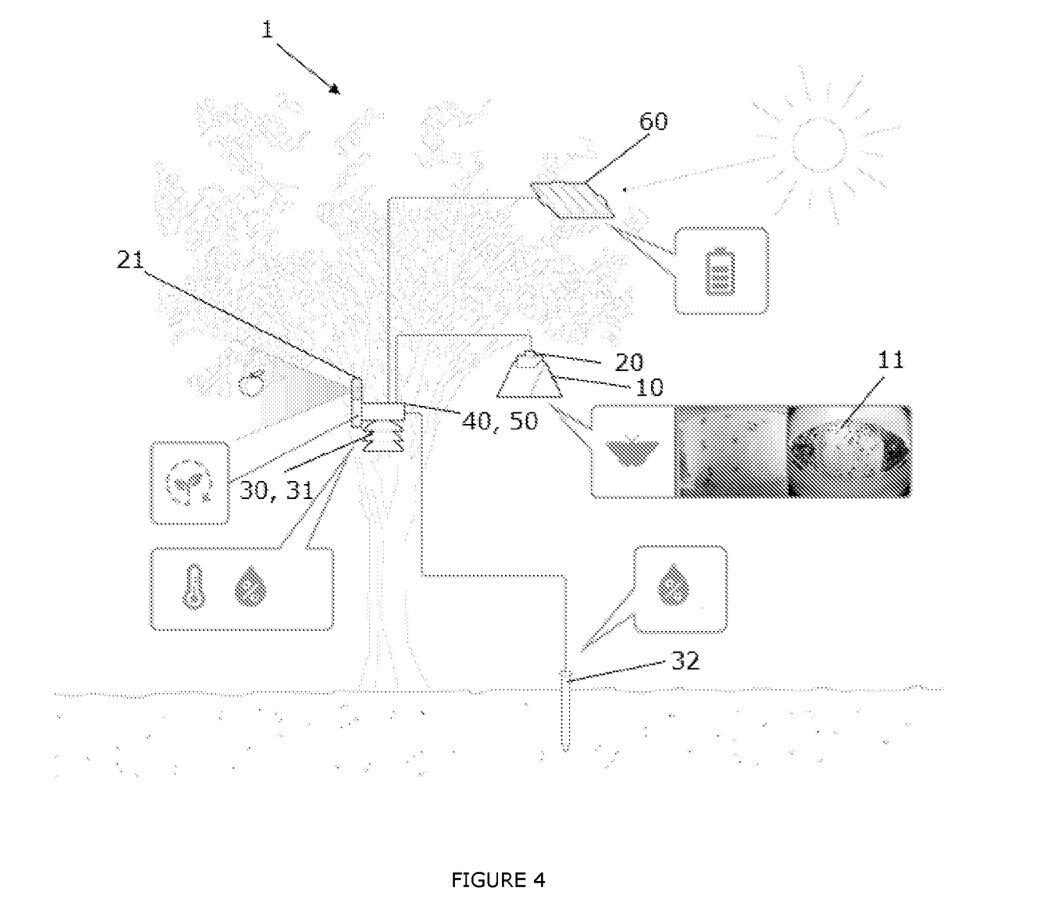
FIG. 4 shows the arrangement of the system to monitor and control the presence of at least one type of insect in agricultural crops in a host according to a preferred configuration of the invention.

On the other hand, FIGS. 3 and 4 show a preferred configuration of the system (1) of the invention. FIG. 3 shows the main components of the system (1) which comprises a capture device (10), such as a pheromone trap which has an inner surface (11) wherein insects are attracted and caught by a sticky substance. Mounted on the capture device (10) is an internal photographic device (20), such as a camera which obtains images of the interior surface (11) of the capture device (10).

The system (1) also includes an external photographic device (21), such as a second camera arranged separately from the capture device (10) to obtain images of the host in which the system is located (1). The external photographic device (21) is arranged together with a hermetic housing that includes the control device (40) and the energy storage device (50), such as a rechargeable lithium battery which must be protected from the inclement weather outside. In turn, in the lower part of this housing the ambient temperature (30) and ambient humidity (31) sensors are arranged, which monitor the climatic conditions of the crop coverage area where the module of devices and sensors is located.

Additionally, the system (1) comprises a soil moisture sensor (32) arranged buried in the ground wherein the host is located to monitor soil conditions. The system (1) may also comprise a soil temperature sensor (not shown in the Figures) in case this data is necessary for decision-making regarding a particular agrochemical.

To supply itself with energy, the system (1) has an energy generation device (60), such as one or more photovoltaic panels which is arranged in such a way as to receive the necessary solar radiation for the correct operation of the all devices and sensors in the system (1).

Finally, FIG. 4 shows the complete system (1) arranged in the host which in this case corresponds to a fruit tree. It can be seen that each of the components of the system (1) is located in the best possible position to carry out the tasks. For example, the capture device (10) together with the internal photographic device (20) is located in an area of the host where the transit of the species to be monitored is more likely, in order to facilitate captures in the inner surface (11) of the capture device (10). On the other hand, the external device (21) together with the control device (40), the energy storage device (50) and the ambient temperature and humidity sensors (30, 31) are arranged in place in where the phenological development of the tree and its fruits and/or flowers can be better observed. On the other hand, the soil moisture sensor (32) is located buried in the ground next to the host tree.

This characteristic regarding the free positioning of the system components (1) allows obtaining precise data for each of the variables to be monitored which are subsequently sent to the analysis device (not shown in the Figures) which can be remotely available to the crop, for example, hosted on a computer. In relation to the positioning of the system components (1) it is desired to particularly highlight the location of the power generation device (60) which is usually located attached to the pheromone trap in state-of-the-art systems, running the risk of not being able to generate the amount of energy necessary for the proper operation of its components given the shadow that the tree itself produces on said component. In the present invention, the power generation device (60) may be arranged freely with respect to the rest of the system components (1), thus allowing said device to be placed on the tree, for example, avoiding any risk that the system does not have enough power to operate correctly.

NUMERICAL REFERENCES

1 System to monitor and control the presence of insects in agricultural crops
10 Capture device
11 Inner surface
20 Internal photographic device
21 External photographic device
30 Ambient temperature sensor
31 Ambient humidity sensor
32 Soil humidity sensor
40 Control device
50 Energy storage device
60 Power generation device

The invention claimed is:

1. A method to monitor and control the presence of at least one type of insect in agricultural crops, comprising the following stages:
attracting and capturing at least one insect by means of at least one capture device (10) towards an inner surface (11) of said at least one device;
obtaining at least one internal photograph of said internal surface by at least one internal photographic device (20);
obtaining at least one external photograph of a crop coverage area by at least one external photographic device (21);
measuring the ambient temperature in the crop coverage area by at least one ambient temperature sensor (30);
measuring the soil temperature in the crop coverage area by at least one soil temperature sensor;
measuring the ambient humidity in the crop coverage area by at least one ambient humidity sensor (31);
measuring soil humidity in the crop coverage area by at least one soil humidity sensor (32);
sending the at least one internal photograph, the at least one external photograph and data on ambient temperature, soil temperature, ambient humidity and soil humidity from the at least one photographic device (20, 21) and the at least one sensor (30, 31, 32) to the at least one control device (40);
sending the at least one internal photograph, the at least one external photograph and the data on ambient temperature, soil temperature, ambient humidity and soil humidity, from the at least one control device (40) to the at least one analysis device;
detecting through the at least one analysis device using the at least one internal photograph sent, if there is at least one insect in it;
in case there is at least one insect in the internal photograph, identifying through the at least one analysis device the species to which the at least one photographed insect belongs;
including in an insect count for the identified species through the at least one analysis device, the at least one identified insect;
determining, through the at least one analysis device using the data on ambient temperature, a degrees day and an accumulated degrees day of the crop coverage area;
determining, through the at least one analysis device, using one or more of the data related to the at least one internal photograph and external photograph, and the degrees day and accumulated degrees day, the phenological stage of the at least one insect;
determining through the at least one analysis device, using one or more of the data related to the at least one external photograph and the degrees day and accumulated degrees day, the phenological stage of the crop coverage area;
evaluating from one or more of the parameters obtained on the species of the at least one insect, the insect count for the identified species, the degrees day, the accumulated degrees day, the data on ambient temperature, soil temperature, ambient humidity and soil humidity, and the phenological stage of the at least one identified insect and of the crop coverage area, if it is appropriate to apply at least one agrochemical in said crop coverage area;

alerting an operator, by at least one display device, in case the application of the at least one agrochemical in the crop coverage area is appropriate;

storing in the at least one analysis device, the parameters obtained on the species of the at least one insect, the insect count for the identified species, the degrees day, the accumulated degrees day, the data on ambient temperature, soil temperature, ambient humidity and soil humidity, the phenological stage of the at least one identified insect and the crop coverage area, and the evaluation about whether the application of the at least one agrochemical is appropriate; and using the stored information about the parameters obtained on the species of the at least one insect, the insect count for the identified species, the degrees day, the accumulated degrees day, the data on ambient temperature, soil temperature, ambient humidity and soil humidity, the phenological stage of the at least one identified insect and the crop coverage area, and about the evaluation of whether the application of the at least one agrochemical is appropriate in the determination of future indications for the application of at least one agrochemical in the crop coverage area.

2. The method according to claim 1, wherein it also comprises sending the location of the at least one internal photographic device (20), of the at least one external photographic device (21) and of the at least one control device (40) through at least one location device.

3. The method according to claim 1, wherein it also comprises energizing the at least one internal photographic device (20), the at least one external photographic device (21), the at least one ambient temperature sensor (30), the at least one soil temperature sensor, the at least one ambient humidity sensor (31), the at least one soil humidity sensor (32) and the at least one location device through at least one energy storage device (50).

4. The method according to claim 1, wherein it further comprises recharging the at least one energy storage device (50) through at least one energy generation device (60), wherein it further comprises sending the location of the at least one power generation device (60) through at least one location device.

5. The method according to claim 1, wherein it also comprises obtaining by means of the at least one analysis device, forecasts of temperature, humidity, rainfall and wind speed and direction from databases hosted on the Internet or in other climatological databases.

6. The method according to claim 5, wherein it also comprises including forecasts of temperature, humidity, rainfall and wind speed and direction in the stage of evaluating whether the application of at least one agrochemical in the crop coverage area is appropriate.

7. The method according to claim 1, wherein the stage of obtaining at least one internal photograph of said interior surface (11), is carried out in a range between 15 minutes and 24 hours.

8. The method according to claim 1, wherein the stage of obtaining at least one external photograph of a crop coverage area, is carried out in a range between 15 minutes and 24 hours.

9. The method according to claim 1, wherein the stage of measuring the ambient temperature by means of at least one ambient temperature sensor (30), is carried out in a range between 15 minutes and 24 hours.

10. The method according to claim 1, wherein the stage of measuring the soil temperature using at least one soil temperature sensor, is carried out in a range between 15 minutes and 24 hours.

11. The method according to claim 1, wherein the stage of measuring ambient humidity using at least one ambient humidity sensor (31), is carried out in a range between 15 minutes and 24 hours.

12. The method according to claim 1, wherein the stage of measuring the ambient humidity of the soil by means of at least one soil humidity sensor (32), is carried out in a range between 15 minutes and 24 hours.

13. The method according to claim 1, wherein the stage of sending the at least one internal photograph, the at least one external photograph and the data on ambient temperature, soil temperature, ambient humidity and soil humidity to at least one analysis device, is carried out at least once every 24 hours through a wireless communication protocol that allows data transfer.

14. The method according to claim 1, wherein the stage of alerting a system operator in the event of the application of the at least one agrochemical in the crop coverage area, comprises indicating a notification date, a recommended application date and a list of the agrochemical product or products that are recommended to be applied in the crop coverage area.

15. A system (1) to monitor and control the presence of at least one type of insect in agricultural crops, comprising:

at least one capture device (10) arranged in a host to attract and capture at least one insect on an inner surface (11) of said device;

at least one internal photographic device (20) arranged on top of the at least one capture device (10) to obtain at least one internal photograph of the inner surface (11) of said at least one capture device (10);

at least one external photographic device (21) arranged so as to point towards a crop coverage area to obtain at least one external photograph of said crop coverage area;

at least one ambient temperature sensor (30) to measure the ambient temperature in the crop coverage area;

at least one soil temperature sensor to measure the soil temperature in the crop coverage area;

at least one ambient humidity sensor (31) to measure the ambient humidity in the crop coverage area;

at least one soil humidity sensor (32) to measure soil humidity in the crop coverage area;

at least one control device (40) to receive data obtained from the at least one internal photographic device (20), the at least one external photographic device (21), the at least one ambient temperature sensor (30), the at least one soil temperature sensor, the at least one ambient humidity sensor (31) and the at least one soil humidity sensor (32) and to monitor their operation;

at least one analysis device which receives the data obtained from the at least one control device to analyze them and evaluate whether the application of at least one agrochemical in the crop coverage area is appropriate; and at least one display device which alerts an operator in case the application of at least one agrochemical in the crop coverage area is appropriate.

16. The system (1) according to claim 15, wherein it also comprises at least one energy storage device (50), wherein the at least one energy storage device (50) is a lead-acid, lithium battery or any material or combination of materials capable of storing electrochemical energy.

17. The system (1) according to claim 15, wherein it also comprises at least one power generation device (60), wherein the at least one power generation device (60) is a photovoltaic panel, and wherein the at least one energy storage device (50) is arranged together with the at least one energy generation device (60).

18. The system (1) according to claim 17, wherein the at least one power generation device (60) is arranged on the at least one capture device (10), or wherein the at least one power generation device (60) is arranged separately from the at least one capture device (10).

19. The system (1) according to any of claim 17, wherein it comprises at least one location device arranged in the at least one internal photographic device (20), in the at least one external photographic device (21), in the at least one control device (40) and in the at least one power generation device (60), wherein the at least one location device is a GPS or any other device that allows geolocation of the at least one capture device.

20. The system (1) according to claim 17, wherein it further comprises at least one first cable to connect the at least one power generation device (60) to the at least one power storage device (50), and at least one second cable to connect the at least one energy storage device (50) to the at least one internal photographic device (20), the at least one external photographic device (21), the at least one ambient temperature sensor (30), the at least one soil temperature sensor, the at least one ambient humidity sensor (31), the at least one soil humidity sensor (32), the at least one control device (40), and the at least one location device.

\* \* \* \* \*